United States Patent [19]
Jannard et al.

[11] Patent Number: 5,638,145
[45] Date of Patent: Jun. 10, 1997

[54] VENTED EYEGLASS LENS

[75] Inventors: James H. Jannard, Eastsound, Wash.; Peter K. Yee, Irvine, Calif.

[73] Assignee: Oakley, Inc., Irvine, Calif.

[21] Appl. No.: 608,711

[22] Filed: Feb. 29, 1996

[51] Int. Cl.$^6$ ................................................ G02C 1/08
[52] U.S. Cl. ...................................... 351/62; 351/41; 2/435
[58] Field of Search ............................ 351/41, 62, 86, 351/96, 106; 2/435, 436, 437

[56] References Cited

U.S. PATENT DOCUMENTS

| | | |
|---|---|---|
| 163,648 | 5/1875 | Gall . |
| 2,027,037 | 1/1936 | Gottlieb . |
| 3,160,735 | 12/1964 | Aufricht . |
| 3,368,221 | 2/1968 | Anderson ............... 2/437 |
| 3,497,294 | 2/1970 | Volk . |
| 4,240,718 | 12/1980 | Wichers . |
| 5,191,364 | 3/1993 | Kopfer . |
| 5,239,320 | 8/1993 | Allendorf et al. . |
| 5,428,411 | 6/1995 | Kopfer . |

FOREIGN PATENT DOCUMENTS

| | | |
|---|---|---|
| 0429899A2 | 6/1991 | European Pat. Off. . |
| 595545 | 10/1925 | France . |
| 766139 | 1/1935 | France . |
| 2205825 | 8/1973 | Germany . |

*Primary Examiner*—Hung X. Dang
*Attorney, Agent, or Firm*—Knobbe, Martens, Olson & Bear, LLP

[57] ABSTRACT

Disclosed is a dual-lens vented eyeglass. In one embodiment, each lens is provided with a plurality of apertures extending therethrough, at the junction between the lens and the surrounding frame. In another embodiment, a plurality of apertures are provided in the frame, surrounding the lens. The apertures optimize ventilation, with minimal intrusion into the optical zone.

5 Claims, 2 Drawing Sheets

VENTED EYEGLASS LENS

BACKGROUND OF THE INVENTION

The present invention relates to eyeglass lenses, and, in particular, to vented eyeglass lenses.

Early dual-lens eyeglass systems generally comprised a right and left lens suspended by an eyeglass frame in the wearer's line of sight. Each of the right and left lenses was generally disposed on a plane which was perpendicular to the wearer's normal or "straight ahead" line of sight. Although the upper portion of the eyeglass frame generally contacts the forehead, a significant ventilation gap was normally present between the lower and lateral edges of the eyeglass lens and the wearer's cheek bone.

Dual lens eyeglasses have more recently been developed in which the eyeglasses exhibit a significant rake and wrap compared to the prior art.

Lens rake refers to the extent to which the lower edge of a lens curves in towards the wearer's face. One effect of enhancing rake in a dual lens system is to more closely conform the lens in the vertical plane to the head of the wearer.

Lens wrap refers to the extent to which the lateral edge of the lens curves rearwardly to conform more closely to the side of the wearer's head.

Increased lens rake and wrap have as a consequence a reduction in the gap between the lower edge of the lens and the face as well as a reduction in the gap between the lateral edge of the lens and the face.

Although increased rake and wrap in dual-lens eyeglasses produce a variety of benefits, one disadvantage is the entrapment of a relatively small volume of air between the lens and the wearer's face. When someone wears eyeglasses of this design during active sports, such as skiing, bicycling or the like, the lenses are susceptible to fogging on the inside surface due to an inadequate ability to circulate moisture-laden air.

Thus, there remains a need for a dual lens eyeglass system which permits a relatively high level of rake and wrap compared to the prior art, yet which minimizes the risk of fogging due to the entrapment of air between the lens and the face of the wearer.

SUMMARY OF THE INVENTION

There is provided in accordance with one aspect of the present invention a vented dual lens eyeglass system. The eyeglass system comprises a right and a left lens, each having a central optical zone and a peripheral edge. Each lens is provided with at least one recess, extending into the lens from the peripheral edge towards the optical zone. The lens is mounted in an eyeglass frame, which surrounds the peripheral edge of the lens to enclose the recess thereby forming an aperture at the junction between the lens and the surrounding frame.

In another embodiment of the invention, each lens is provided with one or more perforations near the peripheral edge. When the lens is mounted in the frame, the frame overlaps at least a portion of the perforation.

Preferably, a plurality of apertures are provided, spaced apart along the junction between the lens and the frame. Apertures may be provided along the top edge of the lens, or the bottom edge, or either lateral edge, or any combination thereof. In a preferred embodiment, an aperture free zone is provided along a lower medial edge of the lens.

In accordance with another aspect of the present invention, there is provided a method of producing a vented dual lens eyeglass. The method comprises the steps of providing a lens blank, and cutting the lens blank to produce a lens having an outer periphery and a plurality of recesses extending radially inwardly into the lens from the outer periphery. The lens is secured to an eyeglass orbital such that the recesses extend radially inwardly from the orbital to produce a plurality of apertures between the lens and the orbital. The orbital may previously or thereafter be secured to a bridge, earstems and other components of a pair of eyeglasses.

In accordance with a further aspect of the present invention, there is provided a method of optimizing ventilation while minimizing interference with the optical zone in a high wrap, high rake dual lens eyeglass system. The method comprises the steps of producing a right and a left lens for a dual lens eyeglass, each of said lenses having a central optical zone and a peripheral edge. A plurality of recesses or apertures are provided at or near the peripheral edge of the lens. The lens is mounted in an eyeglass frame to produce an eyeglass such that the eyeglass frame intersects at least some of the apertures.

In one embodiment of the invention, each lens as mounted has a vertical dimension within the range of from about 1 inch to about 2½ inches, and a horizontal arc length from about 2 inches to about 3½ inches. In an embodiment having a vertical height of about 1½ inches and a horizontal arc length of about 2½ inches, the sum of the cross-sectional area of the apertures is within the range of from about 0.5% to about 15% of the total area of the lens within the surrounding orbital. Preferably, each recess extends no more than about 0.25 inches radially inwardly towards the center of the lens.

Further features and advantages of the present invention will become apparent from the detailed description of preferred embodiments which follows, when considered together with the attached drawings and claims.

DETAILED DESCRIPTION OF PREFERRED EMBODIMENTS

Figure 1:
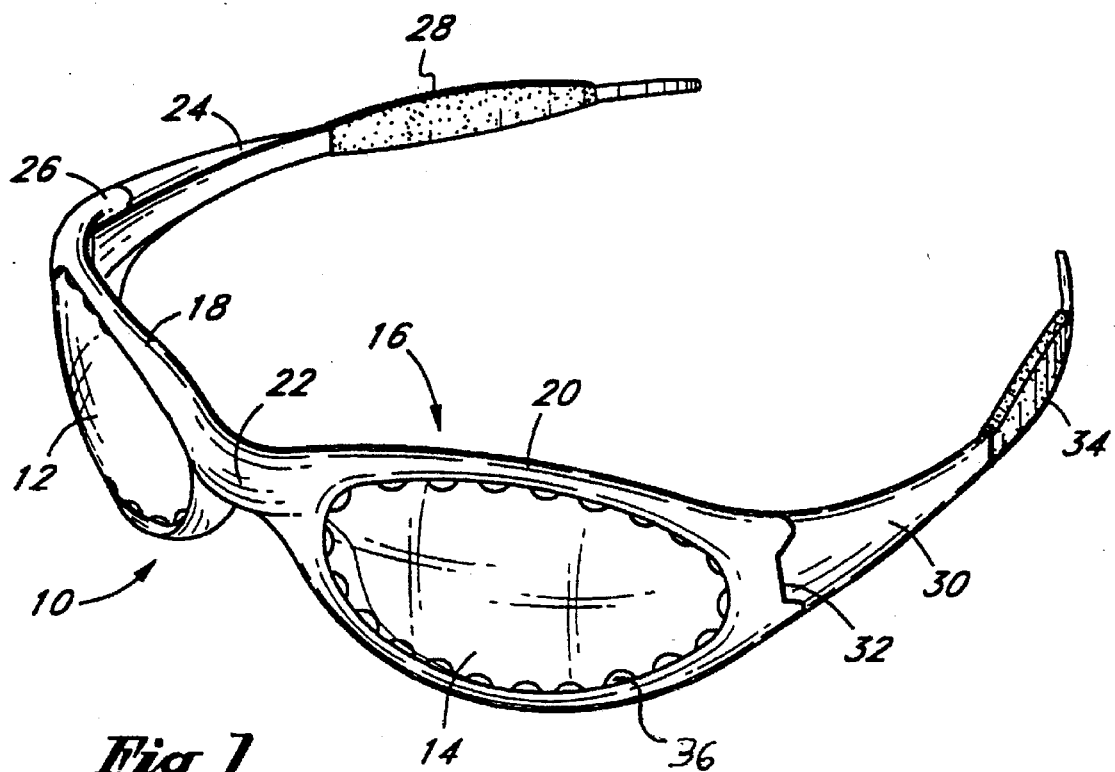
FIG. 1 is a front perspective view of a dual lens pair of eyeglasses in accordance with the present invention.

Referring to FIG. 1, there is disclosed a dual-lens eyeglass system 10. The eyeglass system 10 generally comprises a right lens 12 and a left lens 14 mounted in an eyeglass frame 16 and adapted to be positioned in the wearer's line of sight. Eyeglass frame 16 comprises a right annular orbital 18 for supporting right lens 12 and a left annular orbital 20 for supporting left lens 14. The right orbital 18 and left orbital 20 are connected by way of a bridge 22.

A right temple 24 is connected by way of a hinge 26 to the eyeglass frame 16 as is known in the art. The temple 24 may be provided with any of a variety of structures for improving retention of the eyeglass on the head of the wearer, such as conventional hook shaped rearward portions, or an elastomeric traction device 28. Such devices are disclosed and claimed in U.S. Pat. Nos. 5,054,903 and 5,137,342, the disclosures of which are incorporated herein by reference.

The opposing temple 30 is similarly connected at its forward end by way of a hinge 32 to the frame 16. The rearward end of the temple 30 may also be provided with an elastomeric traction device 34.

Figure 2:
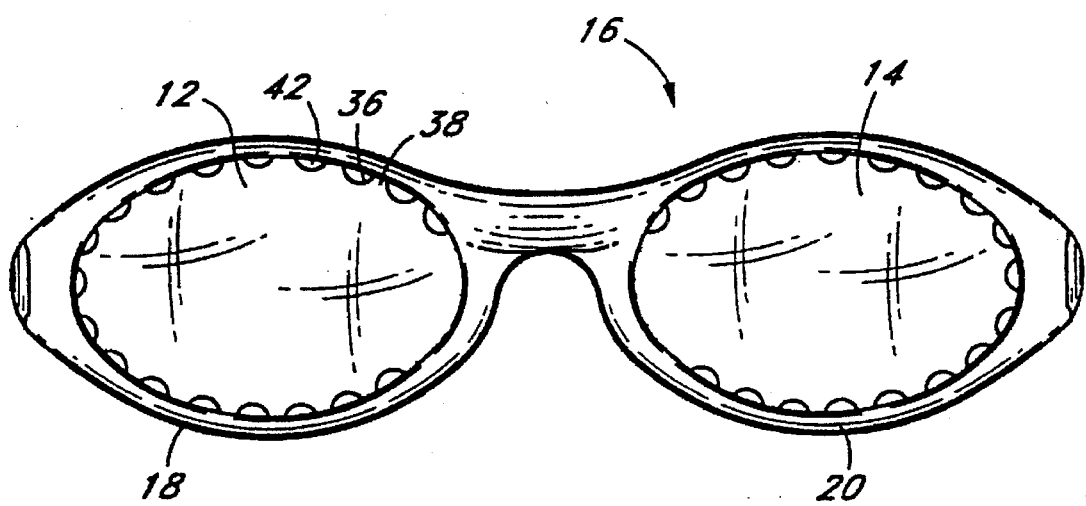
FIG. 2 is a front elevational view of a pair of eyeglasses similar to those in FIG. 1, having a different ventilation aperture pattern.

Referring to FIG. 2, there is disclosed an eyeglass frame 16 as in FIG. 1, having lenses 12 and 14 suspended in orbitals 18 and 20, respectively. Lens 12 is provided with a plurality of apertures 36, separated from each other by lens portions 38 for connecting the lens 12 to the orbital 18. In most embodiments of the present invention, the right and left lenses will be mirror images of each other. Accordingly, the apertures 36 will for simplicity be discussed only in connection with a single lens 12.

Figure 3:
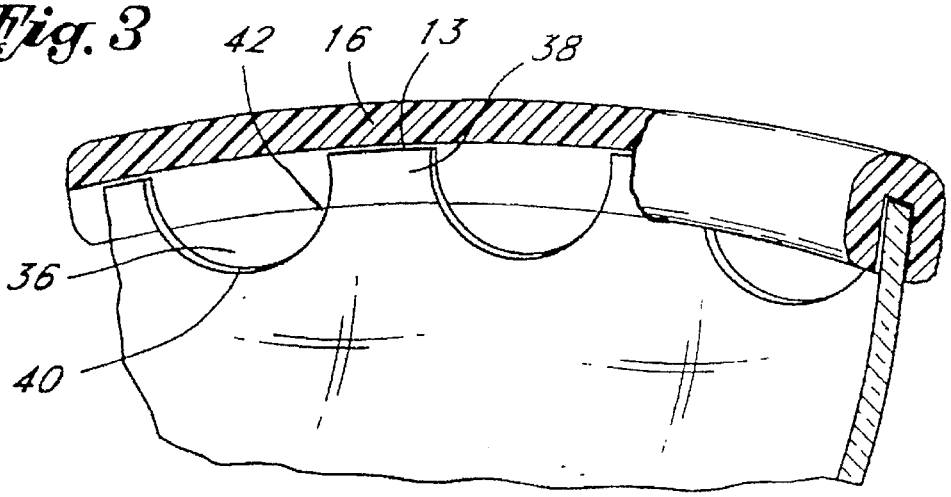
FIG. 3 is a fragmentary cut-away view of a portion of the connection between the lens and the upper frame in the embodiment of FIG. 2.

Referring to FIG. 3, there is disclosed an enlarged fragmentary view of the aperture 36 in a lens mounted within frame 16. In this embodiment, the outer peripheral edge 13 of the lens 12 fits within a radially outwardly extending slot in the orbital 18. Although the present invention will be disclosed in connection with a lens mounted within a slot in the lens orbital, it will be apparent to those of skill in the art that the apertures 36 of the present invention can be readily incorporated into eyeglass systems having lenses mounted to the associated frame in any of a variety of other fashions.

One of the advantages of the design of the present invention is the ability to provide ventilation apertures 36 in a relatively small lens, while at the same time minimizing interference with the optical zone of the lens. In the embodiments illustrated in FIGS. 1–4, this is accomplished by positioning the aperture 36 such that at least a first portion of the circumference of the aperture is formed by the lens and at least a second portion of the circumference of the aperture is formed by a portion of the frame. In an alternate embodiment of the invention illustrated in FIG. 5 and discussed infra, the entire circumference of the aperture is surrounded by the frame.

Apertures can alternatively be positioned in the lens spaced apart from the frame, if the overall lens area is large enough to produce a sufficient uninterrupted optical zone for the desired application.

As will be apparent to those of skill in the art, the cross-sectional shape of the aperture can take any of a variety of forms and still accomplish the objectives of the present invention. For example, FIG. 3 illustrates a lens having a plurality of semicircular apertures 36 at the edge of the lens. Apertures may alternatively be formed by a plurality of enclosed circles punched into the peripheral zone of the lens, which circular holes are partially covered by the frame to produce the appearance of a plurality of semicircles. The apertures 36 in the as mounted condition may thus be defined by a relatively tight radius curved wall 40 in the lens and a relatively flatter curved or straight wall 42 formed by a portion of the frame 16.

The circular or semi-circular indent in the lens which forms aperture 36 can have a constant or substantially constant radius. Alternatively, the aperture 36 can take any of a variety of alternate forms as will be apparent to those of skill in the art in view of the disclosure herein. For example, the aperture may be defined by a portion or all of a circular, semicircular, oval, elliptical, or non regular curved shape depending upon the shape of the recess or aperture and upon its orientation once mounted in the frame. Angular configurations such as triangular, square, rectangular, or others having sharp corners can be used but tend to be less desirable due to stress dispersion considerations as will be apparent to those of skill in the art. However, the provision of radiused corners in an otherwise angular geometry can minimize the risk of lens fracture. Thus, for example, elongated rectangular apertures with slightly rounded corners can be provided to extend along the interface between the frame and the lens.

The cross-sectional size or area of the aperture 36 can also be varied considerably and remain within the scope of the present invention. Two relevant size considerations are the cross-sectional area of each individual aperture 36, as well as the sum of all of the cross-sectional areas of all apertures 36 on a given lens. To achieve a desired total cross-sectional flow area, fewer relatively larger apertures 36 may accomplish the same flow objective as relatively more smaller cross-sectional area apertures 36. In general, the size and number of apertures 36 to achieve a desired total flow area can be optimized depending upon a variety of competing considerations such as desired impact strength for the lens, desired flow distribution across the lens, and the acceptable distance into the optical zone that the apertures 36 can project.

In general, the total cross-sectional flow area of the apertures 36 in the lens will generally range from about 0.2% to about 50% of the total lens area. Preferably the flow area of the apertures will be in the range of from about 0.5% to about 20% of the total lens area, and, more preferably, between about 1% and about 10% of the total lens area. In one embodiment, in a pair of eyeglass lenses as illustrated in FIG. 2 having a generally elliptical shape with vertical height through the lens of about 1.58 inches, and a horizontal arc length of the lens of about 2.62 inches, 13 semicircular apertures each having a radius of about 0.062 inches have a combined cross sectional area of roughly 2.5% of the total area of the lens. For this purpose, the total area of the lens refers to the total area within the orbital or within the outer periphery of the lens if the orbital does not encircle the lens, as though there were no apertures in the lens.

In an embodiment such as that illustrated in FIG. 2, each aperture 36 has a constant radius (r) within the range of from about 1/32 inch to about 1/4 inch. In an embodiment having an aperture diameter of 1/8 inch and having a maximum aperture dimension from the wall 42 to the bottom of the aperture of 1/16 inch, the width of the aperture 36 at the point of contact with the frame (i.e., the length of wall 42 within a given aperture) is therefore about 1/8 inch (2r).

Within the range of from about 1 to about 20 or 30 or more total apertures 36 are typically provided for each lens. As the cross sectional area of each aperture gets too small, however, flow may become unacceptably low due to interference and flow rate limiting effects. Thus, no more than about 12 to 18 apertures are generally preferred.

The minimum number of apertures is affected by a variety of factors, including desired air flow and other aspects of the eyeglass design. For example, if the eyewear conforms very closely to the wearer's head, at least one lower edge aperture and at least one upper edge aperture is preferred to permit a convection flow. Preferably, four or more apertures are provided at each of the upper and lower edges. In terms of area, each of the lower and upper edges is preferably provided with apertures totalling at least about 0.2% and more preferably at least about 1% of the total area of the lens. Apertures can be positioned along the top or the bottom edges or either side, or any combination thereof.

In the embodiment illustrated in FIG. 1, the apertures 36 are spaced apart by a distance of about 2r, all the way around the orbital 18. Spacing between adjacent apertures 36 can vary within the range of from about ½ of the maximum aperture width up to as much as 5 or 10 or more times the length of wall 42 within an aperture 36 (maximum aperture width). The width of each aperture 36 can extend for a longer distance around the circumference of orbital 18, such as in the case of an elongate slot, or a shorter distance around the circumference of orbital 18, as will be apparent to those of skill in the art.

The distribution of apertures 36 around the circumference of the lens 12 may also be varied asymmetrically. For example, in the embodiment illustrated in FIG. 2, no apertures 36 are provided at the medial (nose piece) side of the lens 12. Apertures in this region can, under high wind conditions, produce an undesirable drying of the eye.

In another embodiment of the vented eyeglass lens of the present invention, a plurality of apertures 44 extend both into the lens 46 as well as into the frame 48. See FIG. 4. This embodiment permits a greater preservation of the optical zone of the lens 46. Alternatively, referring to FIG. 5, there is disclosed an embodiment having a plurality of apertures 50 extending through the frame 52. In this embodiment, the entire circumference of the aperture 50 is surrounded by the frame 52. In a further alternative, the apertures extend through the lens but spaced apart from the frame. Alternatively, portions of the frame can be spaced apart from the lens to form one or more flow passages between the lens and the frame.

In most of the embodiments herein, the apertures are either positioned through the frames or adjacent the frame. This permits the use of an additional bore hole (not illustrated) through the frame for communicating with the aperture to provide an additional flow path. The bore hole in one embodiment extends from the aperture radially outwardly through the outer edge of the frame. Bore holes may be provided for each lens or frame aperture, or only for selected apertures depending upon the desired flow characteristics.

Figure 4:
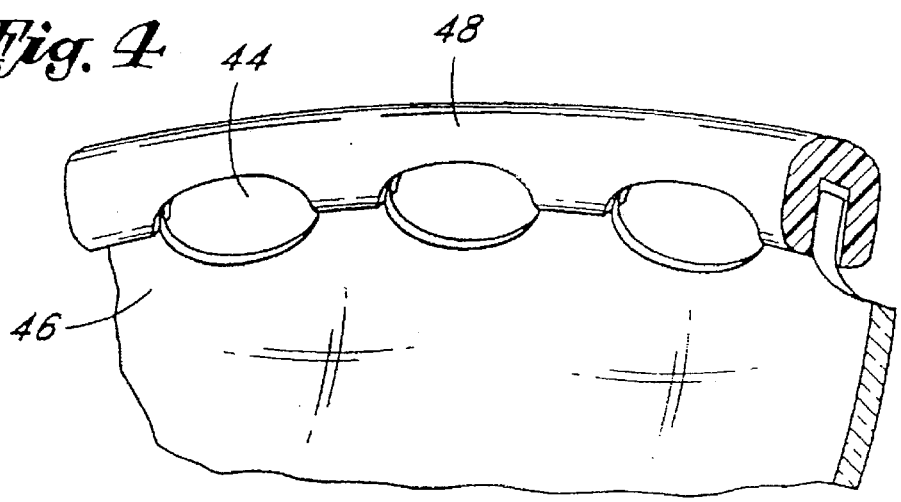
FIG. 4 is a fragmentary view of an alternative embodiment of the vent apertures of the present invention.

Lenses such as lens 12 in FIG. 2 and lens 46 in FIG. 4 can be manufactured in accordance with any of a variety of techniques well known in the art. For example, the lens may be injection molded from an optically suitable material into the form of a raw lens blank. The profile of the desired finished lens may be cut from the lens blank. Where the aperture 36 is formed along the exterior periphery of the lens, the aperture can be formed simultaneously with cutting the lens from the lens blank.

Figure 5:
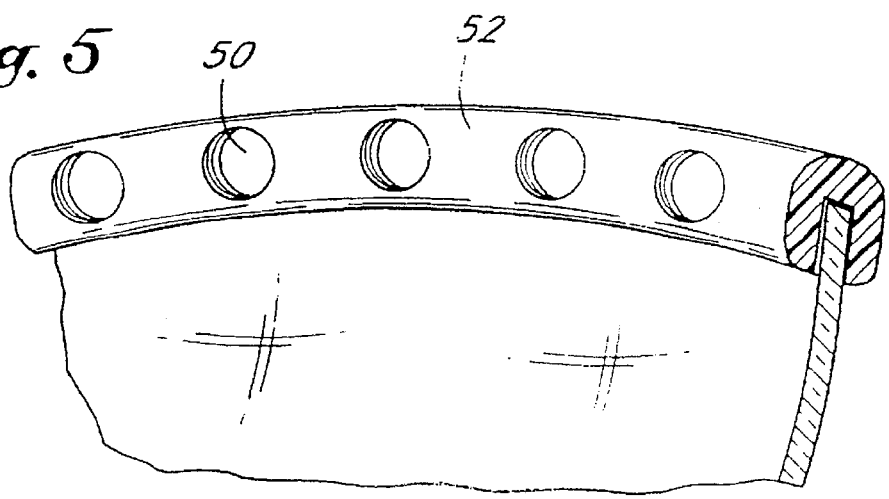
FIG. 5 is another alternate embodiment of the vent apertures of the present invention.

In an embodiment such as that illustrated in FIGS. 4 or 5, the aperture extends either partially or wholly through the eyeglass frame. The eyeglass frame may be formed such as by injection molding, or other techniques which are appropriate for the material of the eyeglass frame. The recesses on the frame which form a portion of aperture 44 as illustrated in FIG. 4 can be formed as a part of the frame molding process, or can be drilled or otherwise provided in the frame in a post-molding operation. Similarly, the apertures 50 in the embodiment illustrated in FIG. 5 can be formed either during the injection molding or other formation process, or can be provided such as by drilling in a post-forming operation. The optimal manufacturing technique can be readily determined by those of skill in the art, in view of the construction materials provided, as well as the dimensions and intended utility of the finished eyeglasses. In the embodiment illustrated in FIG. 5, the apertures 52 may or may not pass through a portion of the lens depending upon the extent to which the lens interfits within the frame 52, and the relative width of the frame 52 as will be apparent to those of skill in the art.

Although the present invention has been described in terms of certain preferred embodiments, other embodiments will become apparent to those of skill in the art in view of the disclosure herein. Accordingly, the present invention is intended to be defined solely by reference to the appended claims, and not limited to the preferred embodiments disclosed herein.

What is claimed is:

1. A vented dual lens eyeglass system, comprising:

a right and a left lens each having a central optical zone and a peripheral edge;

at least one recess extending through the peripheral edge of the lens;

an eyeglass frame surrounding at least a portion of the lens;

wherein the eyeglass frame contacts the peripheral edge of the lens on a first side and on a second side of the recess to enclose a non-tortuous aperture, at least a portion of which is spaced apart from the frame in the direction of the optical zone of the lens.

2. A vented dual lens eyeglass system as in claim 1, comprising a plurality of apertures formed around the peripheral edge of the lens.

3. A vented dual lens eyeglass system as in claim 2, wherein each aperture comprises a curved wall, the convex side of which faces the optical zone.

4. A vented dual lens eyeglass system as in claim 1, wherein the eyeglass lens has a vertical dimension within the range of from about 1 inch to about 2 inches, and a horizontal arc length along the surface of the lens within the range of from about 2 inches to about 3 inches.

5. A method of manufacturing vented eyeglasses, comprising the steps of:

providing a lens blank;

cutting the lens blank to produce a lens having an outer periphery and a plurality of recesses extending radially inwardly into the lens from the outer periphery, each recess bordered by a lens edge; and securing the outer periphery of the lens to an eyeglass orbital such that the recesses extend radially inwardly from the orbital to produce a plurality of apertures between the lens and the orbital, each aperture formed between the edge of the lens surrounding the recess and a portion of the orbital;

wherein a portion of the edge is spaced apart radially inwardly from the portion of the orbital by about the cross section of the aperture.

* * * * *